US011530053B2

(12) United States Patent
Wingo et al.

(10) Patent No.: US 11,530,053 B2
(45) Date of Patent: Dec. 20, 2022

(54) SYSTEMS AND METHODS FOR SPACECRAFT REPROVISIONING

(71) Applicant: Skycorp, Inc., Los Gatos, CA (US)

(72) Inventors: Dennis Ray Wingo, Los Gatos, CA (US); Marco Colleluori, Baltimore, MD (US)

(73) Assignee: SKYCORP, INC., Los Gatos, CA (US)

( * ) Notice: Subject to any disclaimer, the term of this patent is extended or adjusted under 35 U.S.C. 154(b) by 601 days.

(21) Appl. No.: 16/184,797

(22) Filed: Nov. 8, 2018

(65) Prior Publication Data

US 2019/0135456 A1 May 9, 2019

Related U.S. Application Data

(60) Provisional application No. 62/584,002, filed on Nov. 9, 2017.

(51) Int. Cl.
*B64G 1/10* (2006.01)
*B64G 1/64* (2006.01)

(52) U.S. Cl.
CPC ........... *B64G 1/1078* (2013.01); *B64G 1/646* (2013.01)

(58) Field of Classification Search
CPC ............................ B64G 1/1078; B64G 1/646
See application file for complete search history.

(56) References Cited

U.S. PATENT DOCUMENTS

| 5,299,764 | A  | * | 4/1994  | Scott    | B64G 1/1078 |
|           |    |   |         |          | 244/172.5   |
| 6,193,193 | B1 | * | 2/2001  | Soranno  | B64G 1/007  |
|           |    |   |         |          | 244/159.4   |
| 6,275,751 | B1 | * | 8/2001  | Stallard | B64G 1/646  |
|           |    |   |         |          | 244/164     |
| 7,114,682 | B1 | * | 10/2006 | Kistler  | B64G 1/40   |
|           |    |   |         |          | 244/172.2   |
| 7,392,964 | B1 | * | 7/2008  | Anderman | B64G 1/007  |
|           |    |   |         |          | 244/158.2   |
| 7,413,148 | B2 | * | 8/2008  | Behrens  | B64G 1/402  |
|           |    |   |         |          | 244/172.2   |
| 7,559,509 | B1 | * | 7/2009  | Kistler  | B64G 1/002  |
|           |    |   |         |          | 244/172.3   |

(Continued)

*Primary Examiner* — Joseph W Sanderson
(74) *Attorney, Agent, or Firm* — Woods Rogers Vandeventer Black; Timothy J. Bechen; Nathan Evans

(57) ABSTRACT

A reprovisionable spacecraft and reprovisioning subassemblies for mating with a reprovisionable spacecraft are both described. The reprovisionable spacecraft has one or more mechanical, thermal, data, and or electrical mating interfaces for attaching, powering, and communicating with a reprovisioning subassembly, which for one embodiment is a self-contained thruster unit. The self-contained thruster unit preferably comprises a fuel tank, control electronics, and a thruster assembly. Alternately, a reprovisioning subassembly can comprise a fuel tank and control electronics, a fuel tank, or a thruster. Also, a reprovisionable spacecraft may be carried into orbit without reprovisioning subassemblies attached, and then deployed after reprovisioning subassemblies have been attached to their respective mating interfaces. Reprovisioning utilizing a self-contained thruster unit or tank eliminates the large risk associated with refueling satellites in space. Reprovisioning also eliminates the need for a dedicated attached life extension vehicle.

5 Claims, 5 Drawing Sheets

(56) References Cited

U.S. PATENT DOCUMENTS

| | | | | |
|---|---|---|---|---|
| 7,575,200 | B2* | 8/2009 | Behrens | B64G 1/1078 244/172.3 |
| 7,669,804 | B2* | 3/2010 | Strack | B64G 1/646 244/172.4 |
| 7,861,975 | B2* | 1/2011 | Behrens | B64G 1/646 244/172.5 |
| 8,820,353 | B2* | 9/2014 | Yandle | B64G 1/1078 137/614.04 |
| 8,899,527 | B2* | 12/2014 | Allen | B64G 1/1078 244/172.5 |
| 10,850,869 | B2* | 12/2020 | Nicholson | B64G 1/007 |
| 2003/0029969 | A1* | 2/2003 | Turner | B64G 1/007 244/158.9 |
| 2006/0278765 | A1* | 12/2006 | Strack | B64G 1/646 244/172.4 |
| 2007/0051854 | A1* | 3/2007 | Behrens | B64G 1/402 244/172.3 |
| 2007/0228219 | A1* | 10/2007 | Behrens | B64G 1/646 244/172.5 |
| 2008/0121759 | A1* | 5/2008 | Behrens | B64G 1/646 244/172.3 |
| 2012/0000575 | A1* | 1/2012 | Yandle | B64G 1/402 141/98 |
| 2012/0292449 | A1* | 11/2012 | Levin | B64G 1/56 244/158.2 |
| 2013/0119204 | A1* | 5/2013 | Allen | B64G 1/222 244/172.5 |
| 2019/0023422 | A1* | 1/2019 | Nicholson | B64G 1/40 |

* cited by examiner

SYSTEMS AND METHODS FOR SPACECRAFT REPROVISIONING

CROSS-REFERENCE TO RELATED APPLICATION

The application is a non-provisional application of U.S. Provisional Patent Application No. 62/584,002, filed Nov. 9, 2017, which is incorporated herein by reference.

FIELD

An aspect of the invention is directed to a reprovisionable spacecraft and reprovisioning subassemblies for mating with a reprovisionable spacecraft. Other aspects are also described and claimed.

BACKGROUND

The vast majority of spacecraft launched, whether manned or unmanned carry fuel of some kind. These fuels are either solid, liquid, or gas based, and are used to feed engines to provide thrust of one type or another. These fuels are primarily used for example in a thruster/engine to transfer the spacecraft from one orbit to the next, or to transit to different planets or in interplanetary space, or to maintain position in geostationary orbit. Additionally, fuel is used to control the attitude of a satellite in space relative to a planetary body, to an inertial reference frame in interplanetary space, or to remove mechanical energy stored in momentum wheels or other similar devices. A reality for the majority of spacecraft is that their operational lives are largely limited by the amount fuel they carry as well as the continued successful operation of thrusters prior to fuel depletion. Many spacecraft may reach a stage where they are still largely or perfectly working and capable of providing economic or scientific return, yet must be disposed of or abandoned when their fuel is exhausted or a failure occurs in the propulsion system.

There are many solutions in the aerospace arts to overcome this limitation. These solutions fall into two broad classifications. The first is refueling. An example of refueling is the International Space Station (ISS), which must be refueled by an external vehicle (in this case the Russian Progress or European ATV). The ISS then uses this fuel to provide acceleration to boost its orbit to overcome the altitude decay caused by the residual atmosphere at its ~400 km altitude. Another example is the DARPA Robotics Servicing of Geosynchronous Satellites (RSGS), whereby a complex robotic servicing vehicle, through several maneuvering and robotics operations, docks with, and connects to the propulsion system of a client satellite, refuels it, and then undocks to then service another client. The second classification is through the use of a parasitic repositioning vehicle, such as a Spacecraft Life Extension System (SLES) or similar vehicle. The SLES docks with a client spacecraft, and then the internal propulsion system with its own fuel supply of the SLES takes over the functionality of the client vehicle for those activities requiring fuel, whether for repositioning, orbital transfers, maintaining position, or attitude control.

Both of these approaches have technical and economic limitations. Refueling requires advanced robotics that must support either a cooperative or uncooperative refueling process. A cooperative process occurs where a client has robotic interfaces designed for refueling, and an uncooperative process supports clients not being originally designed for refueling and not possessing robotic refueling interfaces designed for that operation.

Refueling is technically risky and involves interfacing to the client fuel system with precision robotics. The refueling process must preclude leakage which can release corrosive liquids, or release gasses which can perturb and or destructively destabilize the attitude of the client/servicer pair. The parasitic repositioning vehicle approach requires the use of a dedicated vehicle (a space tug) to dock with a cooperative or uncooperative client spacecraft. With the parasitic reprovisioning approach, the dedicated parasitic reprovisioning vehicle remains attached to the client vehicle through the time that the client requires its services.

SUMMARY

In one aspect, a reprovisioning subassembly for a reprovisionable spacecraft is disclosed. The reprovisioning subassembly may include, in one aspect, at least one fuel tank; and a mating interface for attaching the reprovisioning subassembly to a reprovisionable spacecraft, wherein the mating interface comprises an internal fuel flow interface whereby once attached to the reprovisionable spacecraft, fuel flow may be activated, and wherein the mating interface can detach the reprovisioning subassembly when its fuel supply has been exhausted. The reprovisioning subassembly may further include control electronics for: controlling the internal fuel flow interface; controlling a thermal environment within the reprovisioning subassembly; and controlling a detachment mechanism related to the mating interface. In addition, the reprovisioning subassembly may include a thruster unit, and the control electronics also comprise control for activating and controlling the thruster unit.

In other aspects, a method is disclosed. The method may include positioning one or more reprovisioning subassemblies in proximity to a spacecraft to be reprovisioned; detaching a subassembly from a location on the spacecraft; and attaching one of the one or more reprovisioning subassemblies to the location on the spacecraft. The method may further include, after replacement of reprovisioning subassemblies attached to the reprovisionable spacecraft, a center of mass of the complete reprovisionable spacecraft, comprising all reprovisioning subassemblies, remains the same as when the reprovisionable spacecraft was initially deployed. In addition, the one of the one or more reprovisioning subassemblies is attached robotically to the spacecraft. Still further, the one of the one or more reprovisioning subassembly is configured for robotic connection and manipulation.

In another aspect, a reprovisionable spacecraft is disclosed, including one or more mating interfaces, each of the one or more mating interfaces having a mechanical interface; an electrical interface; a data communication interface; and a thermal control interface, wherein the one or more mating interfaces are utilized in attaching respective reprovisioning subassemblies thereto, each of the respective reprovisioning subassemblies comprising at least a fuel tank; wherein each of the one or more mating interfaces comprises an internal fuel flow interface whereby once attached to the reprovisionable spacecraft, fuel flow may be activated; and wherein each of the one or more mating interfaces comprises a detachment mechanism such that the reprovisioning subassembly may be detached or robotically removed when its fuel supply has been exhausted. The reprovisionable spacecraft may further include wherein each of the respective reprovisioning subassemblies comprises control electronics for controlling the internal fuel flow interface and for controlling the detachment mechanism. In addition, each of the respective reprovisioning subassemblies may include a thruster unit, and the control electronics comprise control for activating and controlling the thruster unit. In some aspects, after a replacement of one or more of the respective reprovisioning subassemblies attached to the reprovisionable spacecraft, a center of mass of the complete reprovisionable spacecraft comprising all reprovisioning subassemblies, remains the same as when the reprovisionable spacecraft was initially deployed. In some cases, the respective reprovisioning subassemblies are operable to be attached robotically to the reprovisionable spacecraft. In addition, the respective reprovisioning subassemblies are configured for robotic connection and manipulation.

In still further aspects, a method for reprovisioning a reprovisionable spacecraft is disclosed, the method including transporting one or more first reprovisioning subassemblies into orbit; positioning the one or more first reprovisioning subassemblies in proximity with a reprovisionable spacecraft, wherein the reprovisionable spacecraft has one or more mating interfaces for attaching first or second reprovisioning subassemblies thereto, and wherein the first or second reprovisioning subassemblies each comprise at least a fuel tank initially containing a fuel supply; activating a mating interface on each of the one or more second reprovisioning subassemblies attached to the reprovisionable spacecraft, to detach each of the second reprovisioning subassemblies from their respective mating interface on the reprovisionable spacecraft; attaching each of the one or more first reprovisioning subassemblies to a respective mating interface on the reprovisionable spacecraft, the mating interface previously occupied by a second reprovisioning subassembly; and activating at least an internal fuel flow interface on each of the first reprovisioning subassemblies. Each of the first and second reprovisioning subassemblies may include control electronics for controlling the fuel flow interface and for controlling the detachment mechanism. In still further aspects, each of the first and second reprovisioning subassemblies comprises a thruster unit, and the control electronics comprise control for activating and controlling the thruster unit. In addition, in some aspects, after replacement of all second reprovisioning subassemblies initially attached to the reprovisionable spacecraft with first reprovisioning subassemblies, a center of mass of the complete reprovisionable spacecraft, comprising all reprovisioning subassemblies, remains the same with first reprovisioning subassemblies attached as it previously was when the second reprovisioning subassemblies were initially attached. Still further, the first and second reprovisioning subassemblies are attached robotically to the reprovisionable spacecraft. In addition, the first and second reprovisioning subassemblies are configured for robotic connection and manipulation.

In another aspect, a method for initial assembly in space of a reprovisionable spacecraft, is disclosed, the method including transporting one or more first reprovisioning subassemblies, each containing a fuel supply, into orbit; transporting a reprovisionable spacecraft into orbit, wherein when transported, there are no fuel-containing reprovisioning subassemblies attached to the reprovisionable spacecraft; attaching the one or more first reprovisioning subassemblies to the reprovisionable spacecraft; and activating at least an internal fuel flow for each of the first reprovisioning subassemblies. In some cases, each of the first reprovisioning subassemblies comprises control electronics for controlling the internal fuel flow interface and for controlling the detachment mechanism. Still further, each of the first reprovisioning subassemblies comprises a thruster unit, and the control electronics also comprise control for activating and controlling the thruster unit. In addition, after attachment of all first reprovisioning subassemblies to the reprovisionable spacecraft, a center of mass of the complete reprovisionable spacecraft, comprising all reprovisioning subassemblies, is an optimum center of mass per a stated design goal. Still further, the first reprovisioning subassemblies are attached robotically to the reprovisionable spacecraft. In some aspects, the first reprovisioning subassemblies are configured for robotic connection and manipulation. In addition, in some aspects, the first reprovisioning subassemblies may be attached and activated robotically.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

Figure 1:
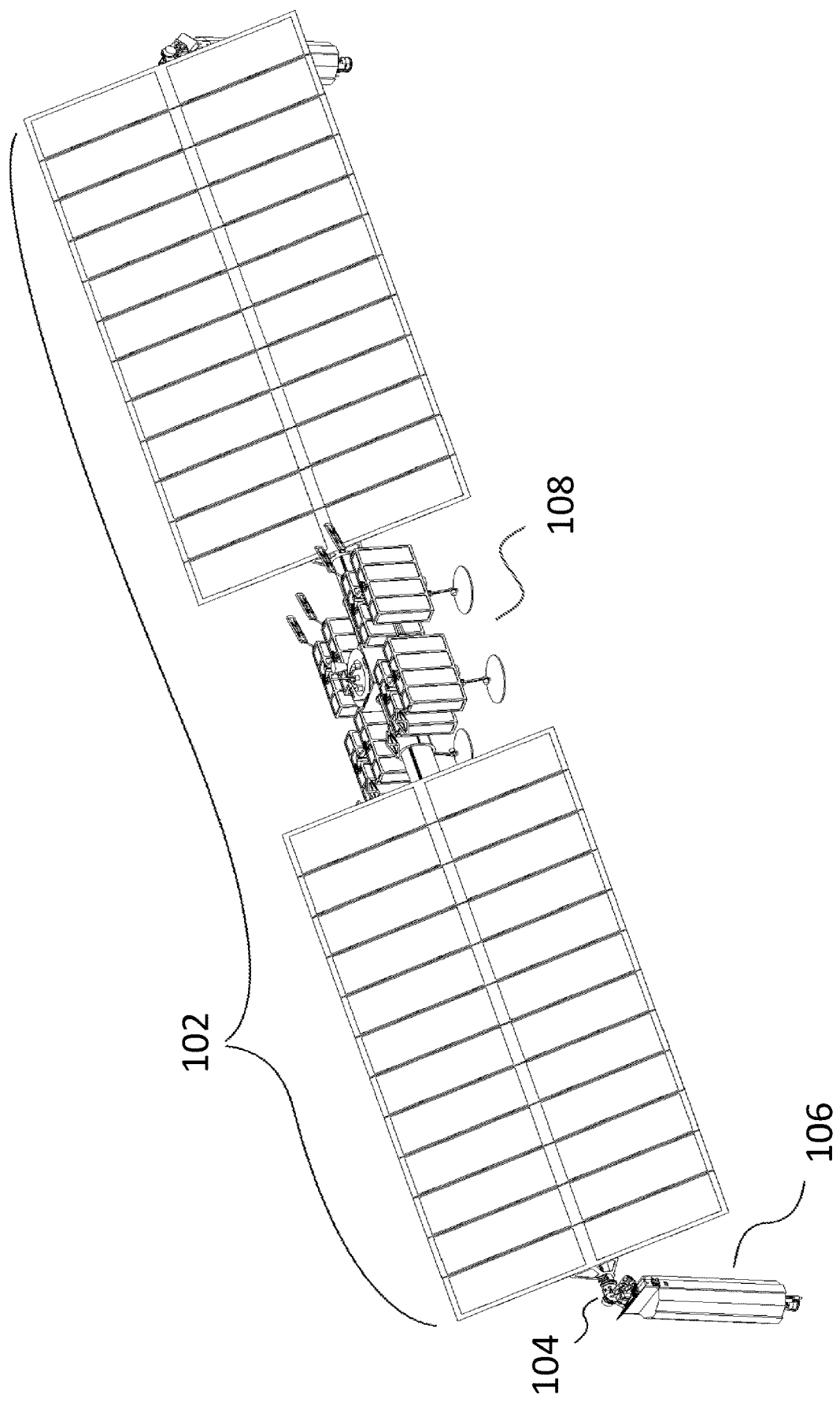
FIG. 1 shows a reprovisionable spacecraft with a reprovisioning subassembly attached.

In this section we shall explain several preferred aspects of this invention with reference to the appended drawings. Whenever the shapes, relative positions and other aspects of the parts described in the aspects are not clearly defined, the scope of the invention is not limited only to the parts shown, which are meant merely for the purpose of illustration. Also, while numerous details are set forth, it is understood that some aspects of the invention may be practiced without these details. In other instances, well-known structures and techniques have not been shown in detail so as not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

A reprovisionable spacecraft and reprovisioning subassemblies for mating with a reprovisionable spacecraft are both described. The reprovisionable spacecraft has one or more mechanical, thermal, data, and or electrical mating interfaces for attaching, powering, and communicating with a reprovisioning subassembly, which for one embodiment is a self-contained thruster unit. The self-contained thruster unit preferably comprises a fuel tank, control electronics, a thruster assembly, a structure, a thermal subsystem for controlling the thermal environment for the thruster and electronics), and robotic interfaces for attachment and/or detachment. Alternately, a reprovisioning subassembly can comprise a fuel tank and control electronics, or just a fuel tank, and robotic interfaces for attachment and/or detachment. Also, a reprovisionable spacecraft may be carried into orbit without reprovisioning subassemblies attached, and then deployed after reprovisioning subassemblies have been attached to their respective mating interfaces. Reprovisioning utilizing a self-contained thruster unit or tank eliminates the large risk associated with refueling satellites in space. Reprovisioning also eliminates the need for a dedicated attached life extension vehicle.

Introducing the term "Reprovisioning" starts by examining the term "Provisioning" which is to provide (in the current context) fuel for a spacecraft for the reasons previously described. To "Reprovision" is to provide an appendage (a "reprovisioning subassembly") including fuel and/or a fuel/thruster/controller combination which typically replaces the original subassembly with a self-contained fully fueled replacement, for some embodiments including a new thruster/controller. Note that embodiments of a reprovisioning subassembly require and include a structure that other components of the reprovisioning subassembly are mounted on or connected to. For one embodiment subsequently described in detail herein a subassembly, containing a cooperative robotic interface connection (which can comprise mechanical, electrical, data, and/or thermal interfaces) is connected to a like cooperative robotic interface connection. The reprovisioning subassembly involved can either be intrinsic (a modular part of the original spacecraft design) or extrinsic (not part of the original spacecraft design). The fuel/engine/controller appendage in another embodiment can also be fitted uncooperatively to a client spacecraft through a simple mechanical interface on the reprovisioning subassembly where it remains until replaced or exhausted. The reprovisioning subassembly is not an independent spacecraft. It is controlled by the client spacecraft after installation.

FIG. 1 shows a spacecraft 102 with a reprovisioning subassembly 106 attached through mating interface 104. Reprovisioning subassembly 106 may be detached from mating interface 104 during a reprovisioning operation whereby the detached reprovisioning subassembly is discarded and replaced with a new reprovisioning subassembly 106 which is complete with integral fuel supply. Also shown in FIG. 1 is payload 108 which may comprise for example but not limited to transponders, antennas, batteries, etc.

Figure 2:
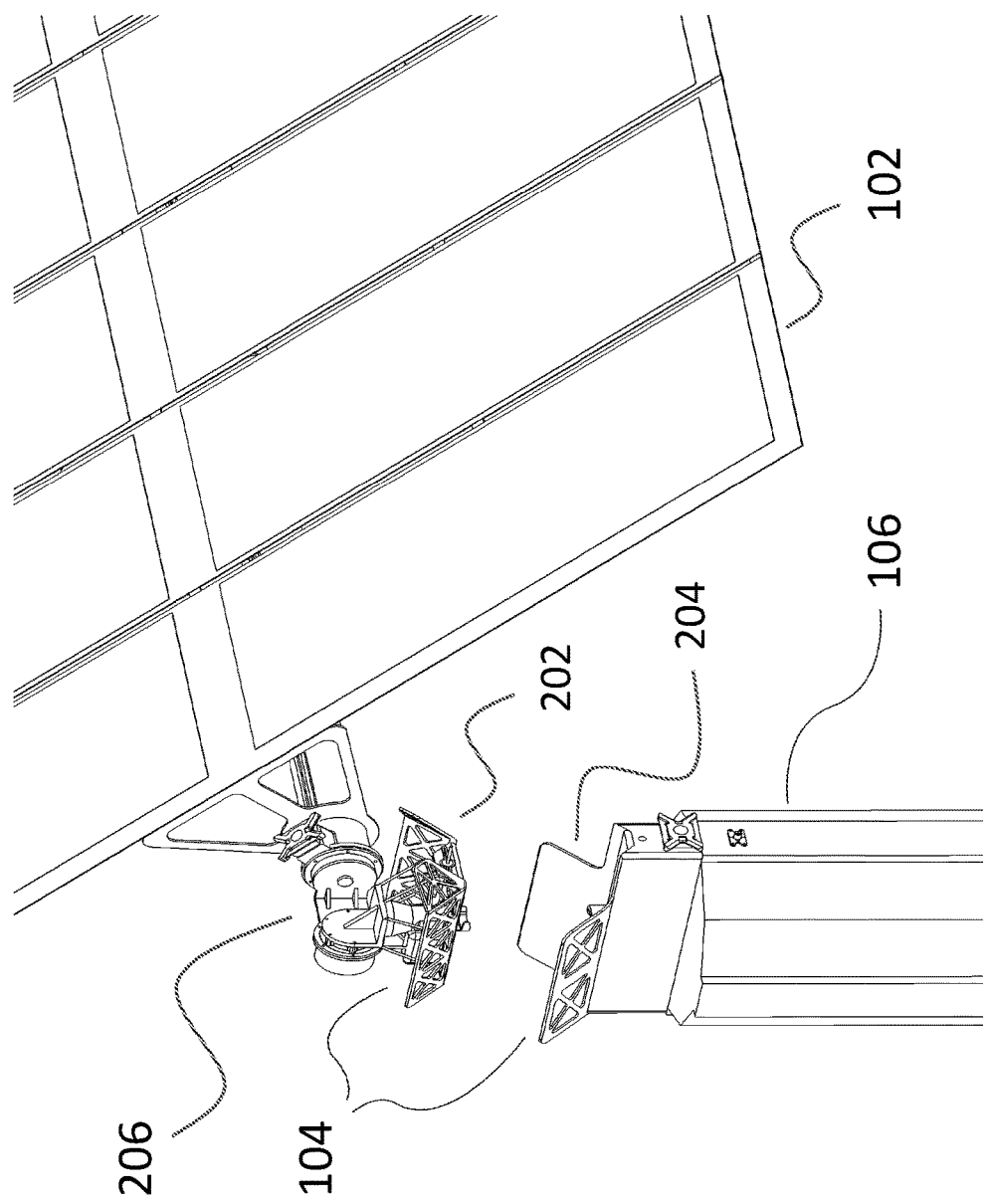
FIG. 2 shows an enlargement of an interface connection between a reprovisionable spacecraft and a reprovisioning subassembly.

FIG. 2 shows an enlargement of mating interface 104 which connects spacecraft 102 with reprovisioning assembly 106. Mating interface 104 comprises a first component 202 attached to spacecraft 102 and a second component 204 attached to reprovisioning assembly 106. First component 202 of mating interface 104 may comprise a number of connector types, optionally including a Langley-type connector. Also, a pointing mechanism 206 may be optionally included between spacecraft 102 and mating interface component 202 which may be controlled robotically to aid in the process of attaching a new reprovisioning subassembly 106 during reprovisioning operations.

Figure 3:
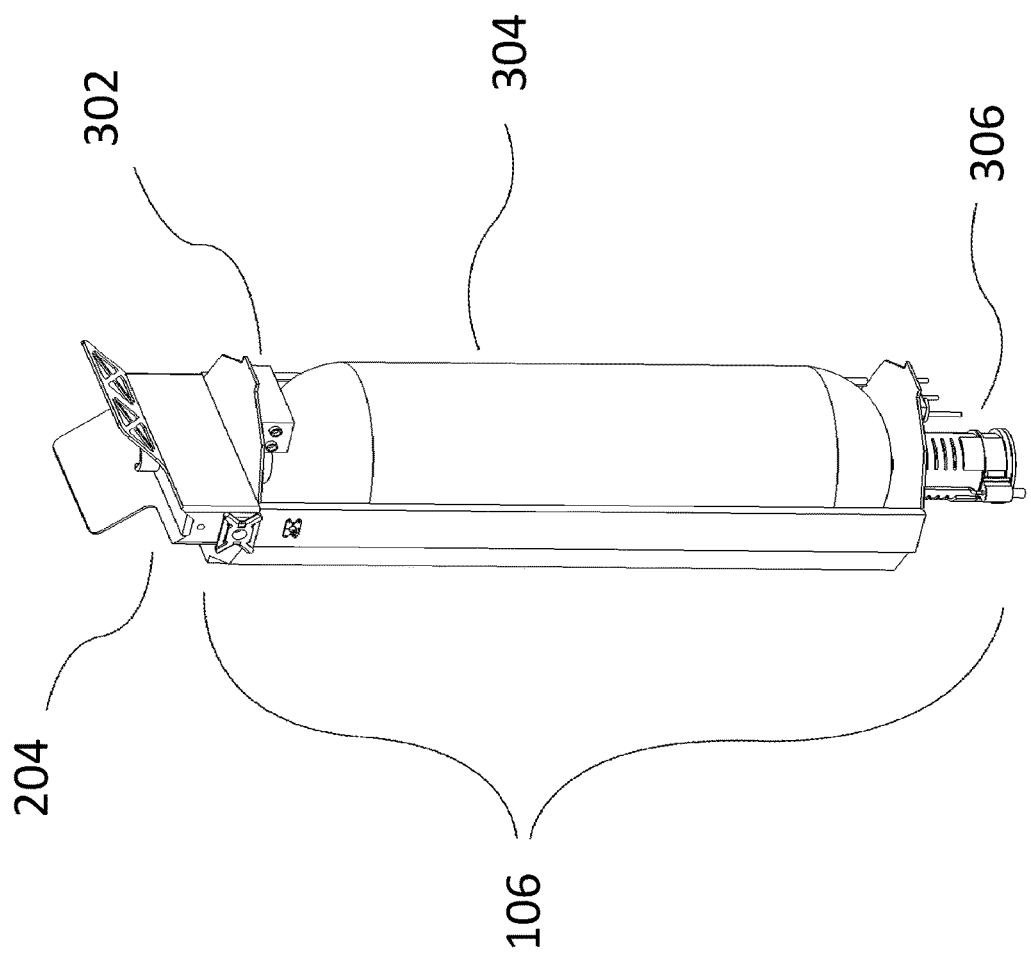
FIG. 3 shows the components of a reprovisionable subassembly.

FIG. 3 shows a reprovisioning subassembly 106 and some possible components. Typically, a reprovisioning subassembly will include a fuel tank 304 which prior to a reprovisioning operation contains a fuel supply. Reprovisioning subassembly 106 may also include control electronics 302 which can control or assist in controlling the reprovisioning process or a number of functions including for example docking operations. Control electronics 302 on reprovisioning subassembly 106 also communicates as required with spacecraft 102. This communication can be performed by either wired or wireless communication using methods known in the art.

A thruster mechanism 306 may be included and is typically controlled at least in part by control electronics 302. At the top of reprovisioning subassembly 106 in FIG. 3 is a component 204 of mating interface 104 that allows connection with a spacecraft. Fuel tank 304 may contain any of a variety of fuel types including but without limitation solid fuel, liquid fuel, and/or gas such as xenon which may be used to power a thruster using ion propulsion techniques.

Figure 4:
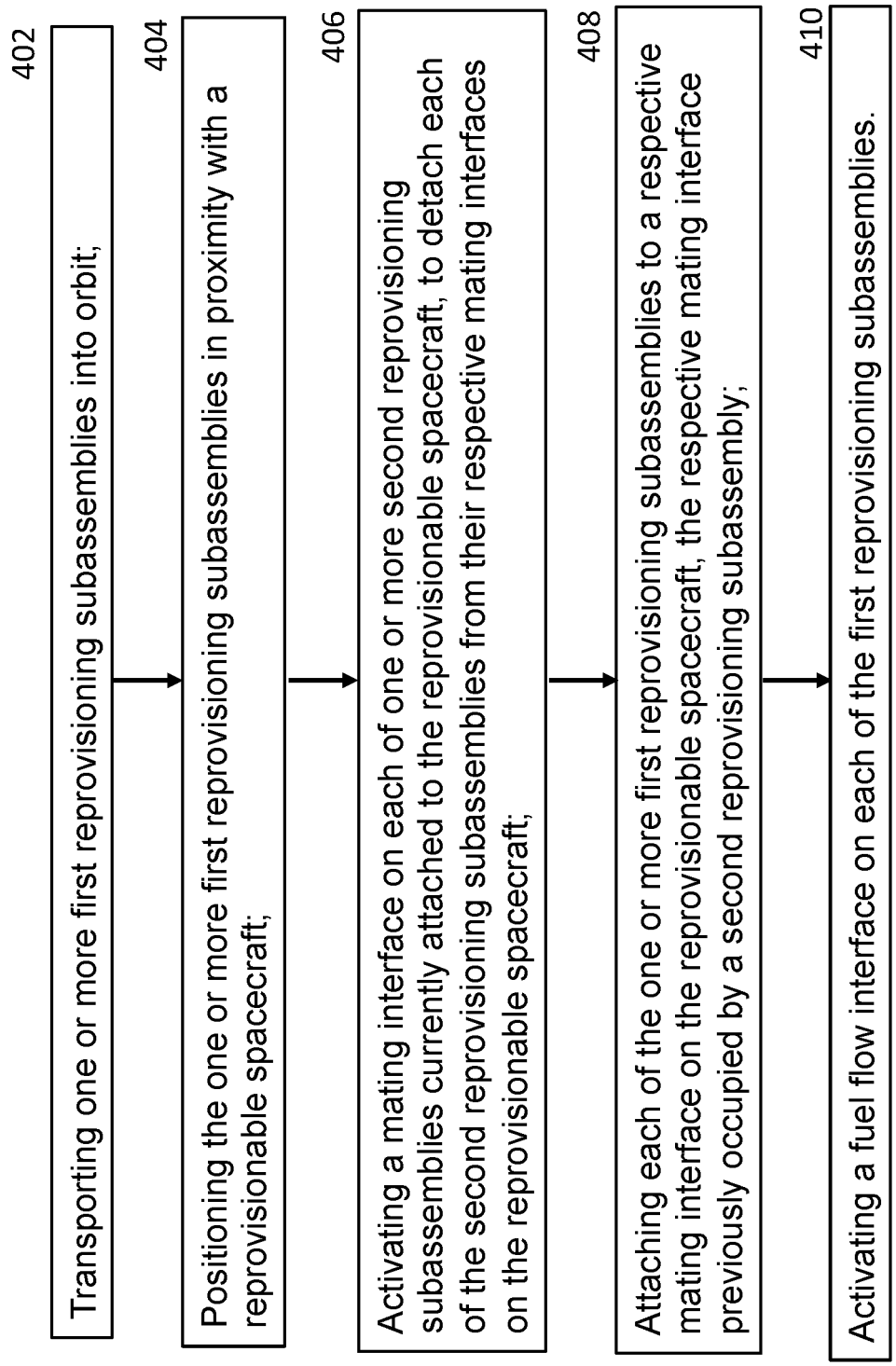
FIG. 4 shows an exemplary process for reprovisioning of a spacecraft using reprovisioning subassemblies.

FIG. 4 shows one exemplary process for reprovisioning of a spacecraft using reprovisioning subassemblies. In step 402, one or more first reprovisioning subassemblies are transported into orbit. In step 404, the first reprovisioning subassemblies are positioned in proximity to the spacecraft to be reprovisioned. In step 406, a mating interface on each of one or more second reprovisioning subassemblies currently attached to the spacecraft is activated to cause detachment of the second reprovisioning subassemblies from their respective mating interfaces on the spacecraft. The one or more second reprovisioning subassemblies, in one embodiment, can include an original subassembly. In step 408, each of the first reprovisioning subassemblies is attached to a respective mating interface on the spacecraft, wherein the respective mating interface was previously occupied by a second reprovisioning subassembly. In step 410, a fuel flow interface on each of the first reprovisioning subassemblies is activated to allow fuel to flow to the thruster as and when required. After replacement of the one or more second reprovisioning subassemblies with the one or more first reprovisioning subassemblies attached to the reprovisionable spacecraft, a center of mass of the complete reprovisionable spacecraft, including all reprovisioning subassemblies, remains the same as when the reprovisionable spacecraft was initially deployed.

Figure 5:
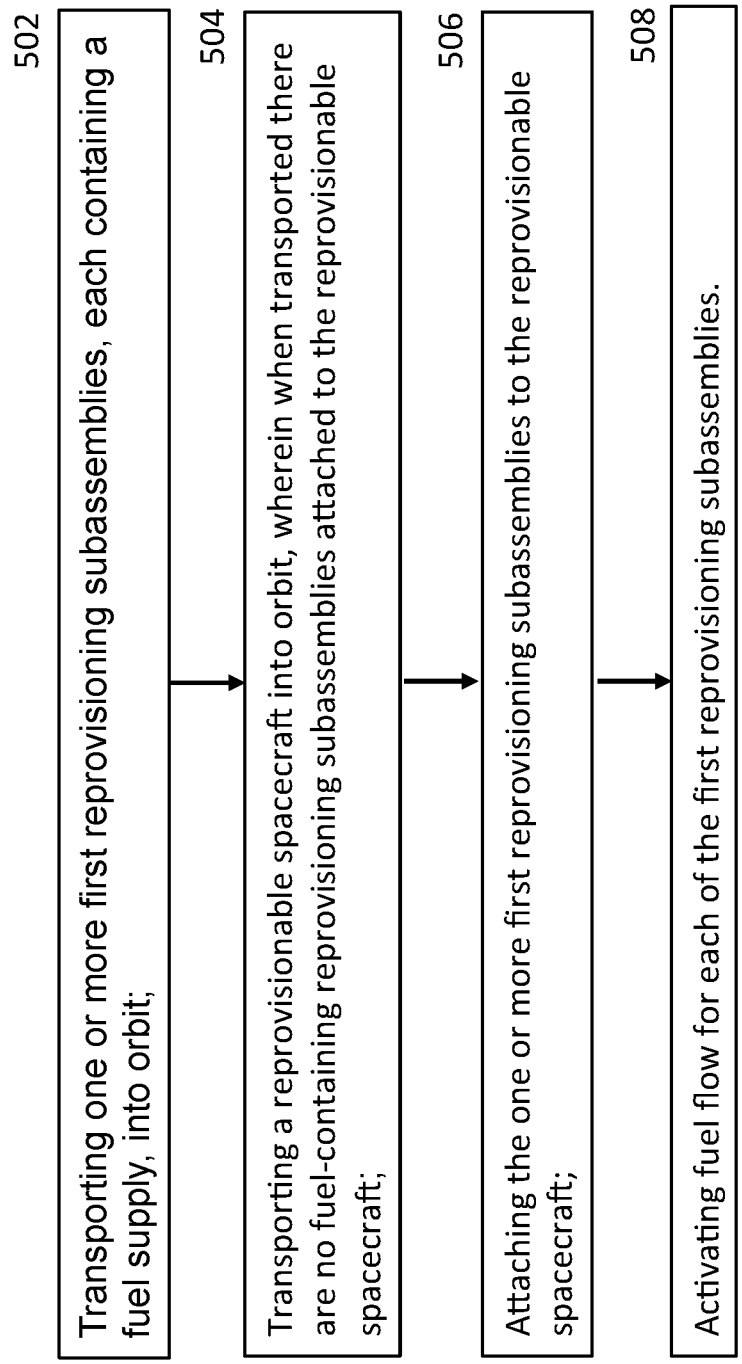
FIG. 5 shows an exemplary process for initial assembly in space where reprovisioning subassemblies are attached for the first time to a spacecraft.

FIG. 5 shows an exemplary process for initial assembly in space where reprovisioning subassemblies are attached for the first time to a spacecraft. In step 502, one or more first reprovisioning subassemblies are transported into orbit wherein each reprovisioning subassembly contains a fuel supply. In step 504, the spacecraft itself is transported into orbit, comprising either a set of unassembled components or having been completely assembled prior to launch, but with no reprovisioning subassemblies containing fuel attached to the spacecraft. In step 506 the one or more first reprovisioning subassemblies are attached to the spacecraft. In step 508, internal fuel flow is activated for each of the first reprovisioning subassemblies.

EXAMPLES

Example 1 is a reprovisioning subassembly for a reprovisionable spacecraft including at least one fuel tank; and a mating interface for attaching the reprovisioning subassembly to a reprovisionable spacecraft, wherein the mating interface includes an internal fuel flow interface whereby once attached to the reprovisionable spacecraft, fuel flow may be activated, and wherein the mating interface can detach the reprovisioning subassembly when its fuel supply has been exhausted.

In Example 2, the reprovisioning subassembly of Example 1 further includes control electronics for controlling the internal fuel flow interface; controlling a thermal environment within the reprovisioning subassembly; and controlling a detachment mechanism related to the mating interface.

In Example 3, the reprovisioning subassembly of Example 2 further includes a thruster unit, and the control electronics also include control for activating and controlling the thruster unit.

Example 4 is a method including positioning one or more reprovisioning subassemblies in proximity to a spacecraft to be reprovisioned; detaching a subassembly from a location on the spacecraft; and attaching one of the one or more reprovisioning subassemblies to the location on the spacecraft.

In Example 5, after replacement of reprovisioning subassemblies attached to the reprovisionable spacecraft, a center of mass of the complete reprovisionable spacecraft, including all reprovisioning subassemblies in the method of Example 4, remains the same as when the reprovisionable spacecraft was initially deployed.

In Example 6, the one of the one or more reprovisioning subassemblies in the method of Example 4 is attached robotically to the spacecraft.

In Example 7, the one of the one or more reprovisioning subassembly in the method of Example 4 is configured for robotic connection and manipulation.

Example 8 is a reprovisionable spacecraft, including one or more mating interfaces, each of the one or more mating interfaces including a mechanical interface; an electrical interface; a data communication interface; and a thermal control interface, wherein the one or more mating interfaces are utilized in attaching respective reprovisioning subassemblies thereto, each of the respective reprovisioning subassemblies including at least a fuel tank; wherein each of the one or more mating interfaces includes an internal fuel flow interface whereby once attached to the reprovisionable spacecraft, fuel flow may be activated; and wherein each of the one or more mating interfaces includes a detachment mechanism such that the reprovisioning subassembly may be detached or robotically removed when its fuel supply has been exhausted.

In Example 9, each of the respective reprovisioning subassemblies of the reprovisionable spacecraft of Example 8 includes control electronics for controlling the fuel flow interface and for controlling the detachment mechanism.

In Example 10, each of the respective reprovisioning subassemblies of the reprovisionable spacecraft of Example 9 includes a thruster unit, and the control electronics include control for activating and controlling the thruster unit.

In Example 11, after a replacement of one or more of the respective reprovisioning subassemblies attached to the reprovisionable spacecraft, a center of mass of the complete reprovisionable spacecraft including all reprovisioning subassemblies of the reprovisionable spacecraft of Example 8, remains the same as when the reprovisionable spacecraft was initially deployed.

In Example 12, the respective reprovisioning subassemblies of the reprovisionable spacecraft of Example 8 are operable to be attached robotically to the reprovisionable spacecraft.

In Example 13, the respective reprovisioning subassemblies of the reprovisionable spacecraft of Example 8 are configured for robotic connection and manipulation.

Example 14 is a method for reprovisioning a reprovisionable spacecraft, including transporting one or more first reprovisioning subassemblies into orbit; positioning the one or more first reprovisioning subassemblies in proximity with a reprovisionable spacecraft, wherein the reprovisionable spacecraft has one or more mating interfaces for attaching first or second reprovisioning subassemblies thereto, and wherein the first or second reprovisioning subassemblies each include at least a fuel tank initially containing a fuel supply; activating a mating interface on each of the one or more second reprovisioning subassemblies attached to the reprovisionable spacecraft, to detach each of the second reprovisioning subassemblies from their respective mating interface on the reprovisionable spacecraft; attaching each of the one or more first reprovisioning subassemblies to a respective mating interface on the reprovisionable spacecraft, the mating interface previously occupied by a second reprovisioning subassembly; and activating at least an internal fuel flow interface on each of the first reprovisioning subassemblies.

In Example 15, each of the first and second reprovisioning subassemblies of the method of Example 14 includes control electronics for controlling the internal fuel flow interface and for controlling the detachment mechanism.

In Example 16, each of the first and second reprovisioning subassemblies of the method of Example 15 includes a thruster unit, and the control electronics include control for activating and controlling the thruster unit.

In Example 17, after replacement of all second reprovisioning subassemblies initially attached to the reprovisionable spacecraft with first reprovisioning subassemblies, a center of mass of the complete reprovisionable spacecraft, including all reprovisioning subassemblies of the method of Example 14, remains the same with first reprovisioning subassemblies attached as it previously was when the second reprovisioning subassemblies were initially attached.

In Example 18, the first and second reprovisioning subassemblies of the method of Example 14 are attached robotically to the reprovisionable spacecraft.

In Example 19, the first and second reprovisioning subassemblies of the method of Example 14 are configured for robotic connection and manipulation.

Example 20 is a method for initially assembly in space of a reprovisionable spacecraft, including transporting one or more first reprovisioning subassemblies, each containing a fuel supply, into orbit; transporting a reprovisionable spacecraft into orbit, wherein when transported, there are no fuel-containing reprovisioning subassemblies attached to the reprovisionable spacecraft; attaching the one or more first reprovisioning subassemblies to the reprovisionable spacecraft.

In Example 21, each of the first reprovisioning subassemblies of the method of Example 20 includes control electronics for controlling the internal fuel flow interface and for controlling the detachment mechanism.

In Example 22, each of the first reprovisioning subassemblies of the method of Example 21 includes a thruster unit, and the control electronics also include control for activating and controlling the thruster unit.

In Example 23, after attachment of all first reprovisioning subassemblies to the reprovisionable spacecraft, a center of mass of the complete reprovisionable spacecraft, including all reprovisioning subassemblies of the method of Example 20, is an optimum center of mass per a stated design goal.

In Example 24, the first reprovisioning subassemblies of the method of Example 20 are attached robotically to the reprovisionable spacecraft.

In Example 25, the first reprovisioning subassemblies of the method of Example 20 are configured for robotic connection and manipulation.

In Example 26, the first reprovisioning subassemblies of the method of Example 20 are attached and activated robotically.

While certain aspects have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A method for reprovisioning a reprovisionable spacecraft, comprising:

transporting a reprovisioning subassembly into orbit, the reprovisioning subassembly including at least one fuel tank, a thruster unit, a flow control system, and an electrical power control system, wherein the reprovisioning subassembly is not an independent spacecraft;

positioning the reprovisioning subassembly in proximity with the reprovisionable spacecraft, wherein the reprovisioning subassembly has a mating interface for attaching the reprovisioning subassembly to the reprovisionable spacecraft, the mating interface is a robotically attachable mechanical and electrical interface, and wherein the reprovisioning subassembly includes a fuel tank initially containing a fuel supply having an internal fuel flow interface controlling fuel flow from the fuel tank;

upon having an available mating interface on the reprovisionable spacecraft, attaching the reprovisioning subassembly to the available mating interface on the reprovisionable spacecraft, the attaching of the provisioning subassembly including a mechanical guide to bring together the mating interfaces of the reprovisionable spacecraft and reprovisioning assembly and a mechanical latch actuated by an external robotic end effector that closes an electrical connection between the reprovisionable spacecraft and the reprovisioning subassembly; and after the attachment of the first reprovisioning subassembly to the reprovisionable spacecraft, activating power and data via the mating interfaces between the reprovisioning subassembly and the reprovisionable spacecraft and activating internal fuel flow solely within the first reprovisioning subassembly and wherein there is no external fuel flow to the reprovisionable spacecraft.

2. The method of claim 1, wherein the first reprovisioning subassembly comprises control electronics for controlling the fuel flow interface and for controlling a detachment mechanism.

3. The method of claim 2, wherein the first reprovisioning subassembly, wherein the control electronics comprise control for activating and controlling the thruster unit.

4. The method of claim 1, wherein the first reprovisioning subassembly is attached robotically to the reprovisionable spacecraft.

5. The method of claim 4, wherein the first reprovisioning subassembly is configured for robotic connection and manipulation.

* * * * *